United States Patent
Stanforth et al.

(10) Patent No.: US 8,868,466 B2
(45) Date of Patent: Oct. 21, 2014

(54) SYSTEM AND METHOD FOR TRANSFERRING SPECTRUM USE RIGHTS

(75) Inventors: Peter Stanforth, Winter Springs, FL (US); Randall C. Chang, Winter Springs, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 1276 days.

(21) Appl. No.: 12/327,920

(22) Filed: Dec. 4, 2008

(65) Prior Publication Data

US 2010/0145745 A1    Jun. 10, 2010

(51) Int. Cl.
*G06Q 30/06* (2012.01)
*G06Q 10/06* (2012.01)
*H04W 16/14* (2009.01)

(52) U.S. Cl.
CPC ............ *G06Q 30/06* (2013.01); *G06Q 30/0601* (2013.01); *H04W 16/14* (2013.01); *G06Q 10/06* (2013.01)
USPC .......................................................... 705/59

(58) Field of Classification Search
USPC .......................................................... 705/59
See application file for complete search history.

(56) References Cited

U.S. PATENT DOCUMENTS

| | | | |
|---|---|---|---|
| 5,608,727 A | | 3/1997 | Perreault et al. |
| 2002/0026478 A1* | | 2/2002 | Rodgers et al. ............... 709/205 |
| 2004/0205533 A1* | | 10/2004 | Lopata et al. ................. 715/507 |
| 2006/0031082 A1 | | 2/2006 | Amaitis et al. |
| 2006/0083205 A1 | | 4/2006 | Buddhikot et al. |
| 2006/0143111 A1* | | 6/2006 | Mylet ............................. 705/37 |
| 2006/0218392 A1 | | 9/2006 | Johnston |
| 2008/0221951 A1 | | 9/2008 | Stanforth et al. |
| 2008/0222019 A1 | | 9/2008 | Stanforth et al. |

OTHER PUBLICATIONS

International Search Report and Written Opinion from corresponding International Application No. PCT/US09/66203.
Kwerel, Evan et al., "A Proposal for a Rapid Transition to Market Allocation of Spectrum", Federal Communications Commission, 2002, OPP Working Paper No. 38, pp. 1-50.
By the Commission, "Second Report and Order, Order on Reconsideration, and Second Further Notice of Proposed Rulemaking", Federal Communications Commission, 2004, FCC 04-167, WT Docket No. 00-230, pp. 1-180.
McKnight, Lee et al., "Best Effort versus Spectrum Markets: Wideband and Wi-Fi versus 3G MVNOs?", pp. 1-18.
Prabhu, Krish et al., "Time for Action" Genuine Ideas, 2002, [retrieved online Feb. 1, 2008], <http://www.genuineideas.com/ArticlesIndex/TimeForAction.htm>.

* cited by examiner

*Primary Examiner* — Dante Ravetti
(74) *Attorney, Agent, or Firm* — Renner, Otto, Boisselle & Sklar, LLP

(57) ABSTRACT

The present disclosure describes systems and methods that facilitate the transfer rights associated with spectrum between parties. Access to spectrum for wireless communications may be transferred from a spectrum holder to a spectrum user while minimizing their role in submitting regulatory agency compliance filings. As a result, parties may transfer spectrum with relative ease, with faster transaction time and lower expense. This leads to more efficient use of the spectrum.

14 Claims, 3 Drawing Sheets

SYSTEM AND METHOD FOR
TRANSFERRING SPECTRUM USE RIGHTS

TECHNICAL FIELD OF THE INVENTION

The technology of the present disclosure relates generally to wireless communications infrastructure and, more particularly, to a system and method for transferring rights in spectrum that is used to support wireless communications.

BACKGROUND

Wireless networks and systems are becoming increasingly popular. But wireless communications are constrained due to a lack of available, interference free spectrum that may be used for reliable communications within a geographic area.

To enhance the availability and reliability of interference free spectrum, procedures that are governed by regulatory agencies (e.g., the Federal Communications Commission (FCC) in the United States) have been developed for allocating and governing spectrum use. In the U.S., for example, the FCC licenses spectrum in a primary spectrum market to Commission licensees. A secondary market exists for the Commission licensees to sublease spectrum for use by other parties. Conventional secondary market leases involve the wholesaling of a spectrum holder's spectrum to another party. This is a one party to one party transaction in which use rights for an entire monolithic block of spectrum are transferred.

By regulation, most subleases in the U.S. involve the submission of a license filing with the FCC and the payment of a corresponding fee to the FCC. As will be appreciated, preparation of the license filing may be time consuming and costly, especially if legal counsel is involved. Regulatory compliance when transferring spectrum use rights places a burden on the free transfer of spectrum use rights, especially when parties may be interested in transferring only a portion of a commission license's use rights in terms of geographic area, duration and/or frequency.

SUMMARY

To facilitate the transfer of spectrum use rights, the present disclosure describes systems and methods for automating the establishment of rights and obligations between parties involved in the transfer of rights associated with spectrum. Also, regulatory agency compliance filings and payments may be automatically generated and submitted to the appropriate regulatory agency. As a result, parties may transfer spectrum with relative ease, with faster transaction time and lower expense.

According to one aspect of the disclosure, a first computer implemented method of transferring rights associated with spectrum includes receiving a description of spectrum that is available for sublease from a spectrum holder, the spectrum description including geographic information, frequency information and time information; creating a sublease agreement between the spectrum holder and a spectrum intermediary for the described spectrum; submitting a regulatory agency filing for the sublease to the regulatory agency; and granting a spectrum user access to at least an apportioned amount of the spectrum, the spectrum user controlled by the spectrum intermediary to operate as a subnetwork within confines of the sublease.

According to one embodiment, the first method further includes submitting a regulatory agency report with data regarding transmitter locations for radio equipment of the spectrum user that operate under the access grant.

According to one embodiment of the first method, radio equipment of the spectrum user is controlled by issuing a spectrum certificate that electronically binds transmissions of the radio equipment.

According to one embodiment of the first method, the described spectrum is apportioned from a larger spectrum holding of the spectrum holder.

According to one embodiment, the first method further includes validating the described spectrum to determine if there are any regulatory or prior spectrum allocation hindrances to a spectrum user's ability to use the described spectrum.

According to one embodiment of the first method, the access grant is made by matching a request from the spectrum user for spectrum to operate a wireless application with the subleased spectrum.

According to another aspect of the disclosure, a second computer implemented method of transferring rights associated with spectrum includes receiving a description of spectrum that is available for sublease from a spectrum holder, the spectrum description including geographic information, frequency information and time information; creating an agreement between the spectrum holder and a spectrum intermediary that entitles the spectrum intermediary to sublease all or part of the described spectrum to another entity; and listing at least a portion of the described spectrum on an automated spectrum exchange as a tradable commodity.

According to one embodiment, the second method further includes validating the described spectrum to determine if there are any regulatory or prior spectrum allocation hindrances to a spectrum user's ability to use the described spectrum.

According to one embodiment, the second method further includes transferring the right to sublease the described spectrum to another spectrum intermediary.

According to one embodiment, the second method further includes exercising the right to sublease the described spectrum by granting a sublease to a spectrum user for at least a portion of the described spectrum.

According to one embodiment, the second method further includes submitting a regulatory agency filing for the sublease to the regulatory agency.

According to one embodiment of the second method, the spectrum for the sublease is identified by matching a request from the spectrum user for spectrum to operate a wireless application with the described spectrum.

According to another aspect of the disclosure, a first system for transferring rights associated with spectrum includes a memory that stores executable code; and a processor that executes the code, wherein the code stored by the memory and executed by the processor contains logic to receive a description of spectrum that is available for sublease from a spectrum holder, the spectrum description including geographic information, frequency information and time information; create a sublease agreement between the spectrum holder and a spectrum intermediary for the described spectrum; submit a regulatory agency filing for the sublease to the regulatory agency; and grant a spectrum user access to at least an apportioned amount of the spectrum, the spectrum user controlled by the spectrum intermediary to operate as a subnetwork within confines of the sublease.

According to one embodiment of the first system, the code also contains logic to submit a regulatory agency report with data regarding transmitter locations for radio equipment of the spectrum user that operate under the access grant.

According to one embodiment of the first system, the code also contains logic to issue a spectrum certificate to the spectrum user for controlling the spectrum user, the spectrum certificate electronically binding transmissions of the radio equipment of the spectrum user.

According to one embodiment of the first system, the described spectrum is apportioned from a larger spectrum holding of the spectrum holder.

According to one embodiment of the first system, the code also contains logic to validate the described spectrum to determine if there are any regulatory or prior spectrum allocation hindrances to a spectrum user's ability to use the described spectrum.

According to one embodiment of the first system, the code also contains logic to match a request from the spectrum user for spectrum to operate a wireless application with the subleased spectrum to grant the spectrum access.

According to another aspect of the disclosure, a second system for transferring rights associated with spectrum includes a memory that stores executable code; and a processor that executes the code, wherein the code stored by the memory and executed by the processor contains logic to: receive a description of spectrum that is available for sublease from a spectrum holder, the spectrum description including geographic information, frequency information and time information; create an agreement between the spectrum holder and a spectrum intermediary that entitles the spectrum intermediary to sublease all or part of the described spectrum to another entity; and list at least a portion of the described spectrum on an automated spectrum exchange as a tradable commodity.

According to one embodiment of the second system, the code also contains logic to validate the described spectrum to determine if there are any regulatory or prior spectrum allocation hindrances to a spectrum user's ability to use the described spectrum.

According to one embodiment of the second system, the code also contains logic to transfer the right to sublease the described spectrum to another spectrum intermediary.

According to one embodiment of the second system, the code also contains logic to exercise the right to sublease the described spectrum and grant a sublease to a spectrum user for at least a portion of the described spectrum.

According to one embodiment of the second system, the code also contains logic to submit a regulatory agency filing for the sublease to the regulatory agency.

According to one embodiment of the second system, the code also contains logic to match a request from the spectrum user for spectrum to operate a wireless application with the subleased spectrum to create the sublease.

According to one embodiment of the second system, the spectrum is listed as a future.

According to one embodiment of the second system, the spectrum is listed as an option.

According to one embodiment of the second system, the spectrum is listed as being available for sublease.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
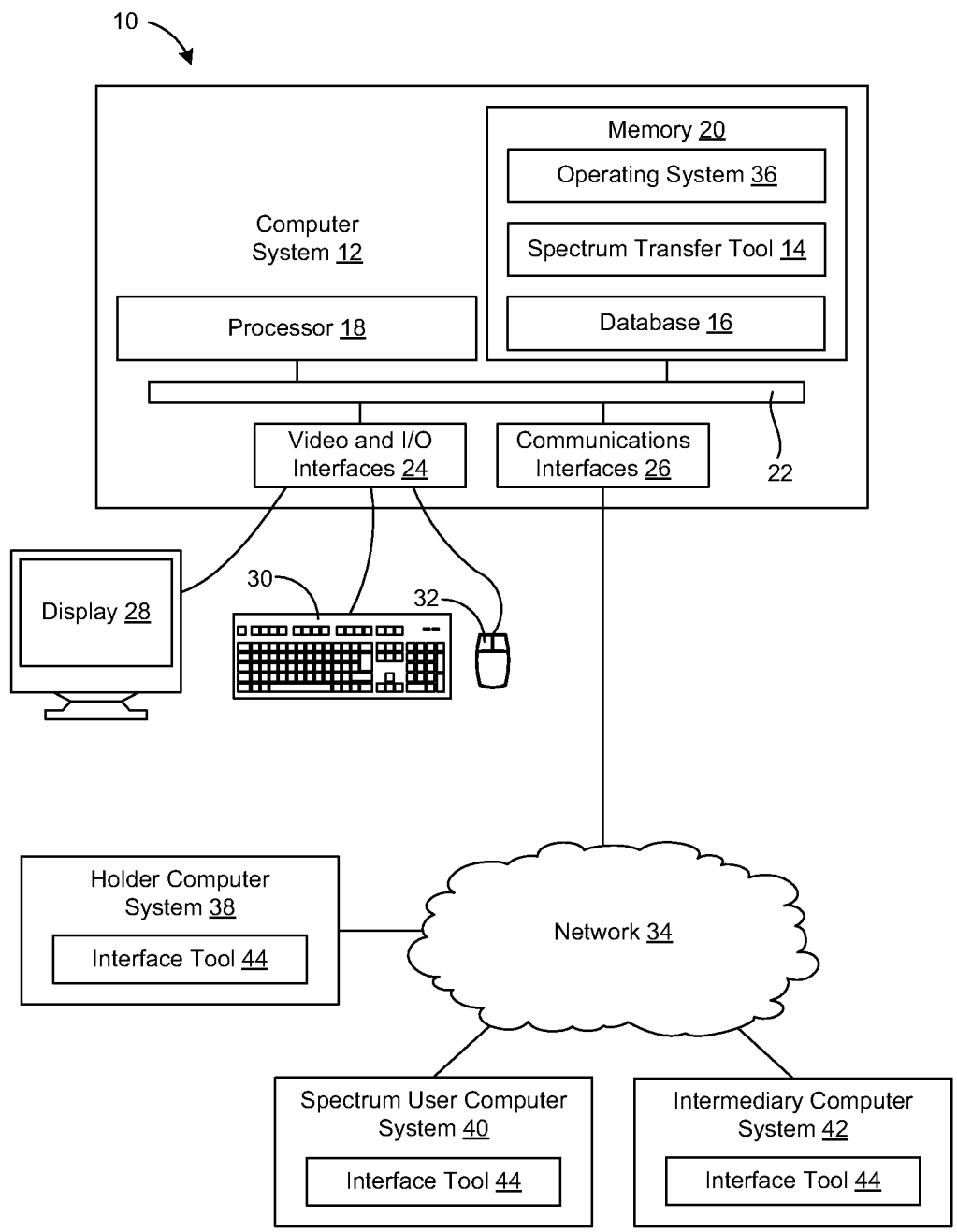
FIG. 1 is a schematic view of an exemplary system for transferring rights associated with spectrum.

Embodiments will now be described with reference to the drawings, wherein like reference numerals are used to refer to like elements throughout. It will be understood that the figures are not necessarily to scale.

A. OVERVIEW

A(1). Parties

In this document, described are various entities that may have a relationship to electromagnetic spectrum for use in wireless communications. One entity is a spectrum holder, or simply a holder. A holder is any entity having the authority to release spectrum use to another entity by granting the other entity access to the spectrum. The granting of access may be a temporary permission to use spectrum that is associated with the holder. Therefore, the access grant need not be a lease or a sublease, as defined by the FCC. The holder may be, but is not limited to, a government or regulatory agency (e.g., in the United States, the FCC), a Commission licensee (e.g., in the United States, an entity that has licensed spectrum directly from the FCC in the primary spectrum market), or a secondary market licensee. The term Commission licensee includes a holder that licenses spectrum from an appropriate regulatory entity in places other than the United States.

Another entity is a spectrum user, or simply a user. A spectrum user is any entity or wireless communications system that has a need for spectrum in order to carry out wireless communications. The spectrum user also may be a holder. A spectrum user may be distinguishable from a human operator of a computer-based system. Such a human operator also referred to as a "user," but the context of use will suffice to differentiate a spectrum user from a computer system user.

Another entity is a spectrum broker. A spectrum broker is any entity that hosts an automated spectrum exchange that matches available spectrum from holders to spectrum needs of users. Use rights for the matched spectrum may then be transferred from the holder to the user under specified parameters, such as time duration, geography, transmission power, spectral mask, etc. Additional description of such an exchange of spectrum is described in U.S. patent application Ser. No. 12/042,543, filed Mar. 5, 2008, the disclosure of which is incorporated herein by reference in its entirety.

The spectrum broker may be a holder, a user or a third party. In some instances, the term broker may be used to refer to a device or system that hosts a spectrum exchange function and is not to be confused with an entity that owns or operates the corresponding device or system.

Another entity is a spectrum intermediary. The spectrum intermediary may host a spectrum exchange and, therefore, may be the same entity as a spectrum broker. In other embodiments, there may be a spectrum intermediary and a spectrum broker, or just a spectrum intermediary. The spectrum intermediary or another party may host a computer system for facilitating the transfer of rights that are associated with spectrum.

In some embodiments, the spectrum intermediary may be a market maker that acquires spectrum rights from a holder and submits sublease compliance documentation with a regulatory agency. The market maker may allow one or more users to use the spectrum in a controlled manner so as to minimize the need to file sublease compliance documentation on behalf of each grant of spectrum access rights to the user(s).

In other embodiments, the spectrum intermediary may be considered an investor or speculator that acquires rights from the holder to offer spectrum use rights in the spectrum to others. These use rights may be in the form of immediate or future use rights, options, futures, and so forth. Therefore, the intermediary may transfer all or part of its rights to offer spectrum use rights to another spectrum intermediary or to an actual spectrum user.

A(2). Wireless Communications Context

Aspects of the disclosed systems and methods are independent of the type or types of radio devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum. Furthermore, the methods and systems are generic to modulation schemes, harmonic considerations, frequency bands or channels used by the radio devices, the type of data or information that is transmitted, how the radio devices use received information, and other similar communications considerations. Thus, the systems and methods have application in any suitable environment.

A(3). General Considerations

This disclosure describes techniques that facilitate the transfer of rights associated with spectrum. As will become more apparent, the systems and methods allow for the ultimate transfer of spectrum use rights from a holder (e.g., a Commission licensee) to a spectrum user where the regulatory filing burdens on these parties is minimized. Therefore, the knowledge level of these parties in terms of regulatory compliance may be fairly low when using the disclosed systems and/or methods to acquire or transfer spectrum use rights.

In many instances, a holder may be interested in apportioning some of its spectrum so that the holder may offer a resulting portion of spectrum to another entity, but the holder may maintain use rights in the remainder of the spectrum or allow another user to use other portions of the spectrum. A holder may apportion its spectrum according to any combination of geography (referred to as partitioning the holder's spectrum), frequency or channel plan (referred to as disaggregating the holder's spectrum), and time (referred to as time-slicing the holder's spectrum). For example, a license may be partitioned into one or more parts along any geographic boundary that is inside the original license area. Identifiable partition areas may be as small as a single city block (or smaller) or as large as a state or entire national region, as long as each partition fits inside the original license boundary. Disaggregation of licensed spectrum refers to the situation where a spectrum holder divides up a spectrum license by frequency or channels. For example, a 10 MHz license could be disaggregated into two 5 MHz parts, or ten 1 MHz parts, or any other combination totaling up to, but not exceeding the entire licensed amount. Therefore, using a combination of partitioning, disaggregation, and time-slicing, any part of a spectrum license in terms of geography, frequency (or channel) and/or duration may be identified and rights associated with that portion of spectrum may be offered to another entity or reallocated back to the holder.

Similarly, a user may be interested in obtaining use rights in spectrum for a period of time, in a geographic area and/or for the support of throughput that is smaller than the total use rights supported by a holder's entire spectrum holding. These use rights may be acquired by obtaining spectrum use rights that have been apportioned from the larger spectrum holdings of another entity.

Each apportioned segment of spectrum for which access permission may be transferred may be identified by several components and each component is defined by one or more variables. Exemplary components include a time window, a frequency-based spectral mask, a geography-based emission mask and a transmitted power limit. Also, radios operating under spectrum use rights that have been transferred from a holder to a user may be controlled with a data object known as a spectrum certificate. The spectrum certificate may contain at least one spectrum-related variable under which the radio (s) associated with the spectrum user system is to engage in wireless communications. Additional details regarding the apportionment of spectrum and the issuance of spectrum certificates may be found in the above-mentioned U.S. patent application Ser. No. 12/042,543, filed Mar. 5, 2008.

The time window for the apportionment of spectrum may be a period of time that has a starting point given by a day and time and an ending point given by a day and time. Alternatively, the time window may be a period of time specified by a starting time and a duration. The time window may be as short as a second and as long as years.

The frequency-based spectral mask, as is known in the art, may be a mathematically defined set of lines applied to levels of radio transmission. The frequency-based spectral mask is generally intended to reduce interference by limiting excessive radiation at frequencies outside a certain bandwidth. Spectral masks often include a center frequency and/or a frequency range. Also, spectral masks often include an absolute power component or a relative power component. For an absolute power component, the frequency-based spectral mask may specify that transmission beyond a specified frequency range must be below a specified power value. For a relative power component, the frequency-based spectral mask may specify that transmission beyond a specified frequency range must be below a relative power value as determined by a function, such as a specified power value below the total amount of power being transmitted.

The geography-based emission mask may include a defined geographical boundary that radios operating in accordance with the emission mask may not appreciably transmit beyond. The geographical boundary specified by the geography-based emission mask may be a complex construct that relates to a contiguous or non-contiguous area. The amount of permissible transmission beyond the geographical boundary may be determined in an absolute manner or a relative manner. For an absolute manner, the geography-based emission mask may specify that transmission beyond the boundary must be below a specified power value. For a relative manner, the geography-based emission mask may specify that transmission beyond the boundary must be below a relative power value as determined by a function, such as a specified power value below the total amount of power being transmitted. In one embodiment, the function used for calculating the relative power value may include a distance parameter so that the relative power value may be calculated as a function of distance away from the boundary or other geographical reference.

The geography-based emission mask, alone or in combination with the time window, the frequency-based spectral mask and the transmitted power limit, may be established to control an amount of interference that a user system generates with respect to continued operations of the spectrum holder and/or other users.

The transmitted power limit may be a power value that radios operating in accordance with the transmitted power limit may not exceed. The transmitted power limit may be absolute or relative. The transmitted power limit may be independent of the frequency-based spectral mask and/or the geography-based emission mask. The transmitted power limit may be expressed as an average power value (e.g., average total power), a peak power value, or similar value. Exemplary transmitted power limits are 500 milliwatts (mW), one watt (W), 1,000 watts, etc.

B. SYSTEM ARCHITECTURE

With reference to FIG. 1, illustrated is a schematic block diagram of a computer-based system 10 capable of executing computer applications (e.g., software programs). The system 10 may include a computer 12. The computer 12 may be configured to execute a spectrum transfer tool 14 and to store a database 16 that contains data regarding spectrum information that is used by the spectrum transfer tool 14.

In one embodiment, the spectrum transfer tool 14 is embodied as one or more computer programs (e.g., one or more software applications including compilations of executable code). The computer program(s) and/or database 16 may be stored on a machine (e.g., computer) readable medium, such as a magnetic, optical or electronic storage device (e.g., hard disk, optical disk, flash memory, etc.).

To execute the tool 14, the computer 12 may include one or more processors 18 used to execute instructions that carry out a specified logic routine(s). In addition, the computer 12 may have a memory 20 for storing data, logic routine instructions, computer programs, files, operating system instructions, and the like. As illustrated, the tool 14 and the database 16 may be stored by the memory 20. The memory 20 may comprise several devices, including volatile and non-volatile memory components. Accordingly, the memory 20 may include, for example, random access memory (RAM) for acting as system memory, read-only memory (ROM), hard disks, floppy disks, optical disks (e.g., CDs and DVDs), tapes, flash devices and/or other memory components, plus associated drives, players and/or readers for the memory devices. The processor 18 and the components of the memory 20 may be coupled using a local interface 22. The local interface 22 may be, for example, a data bus with accompanying control bus, a network, or other subsystem.

The computer 12 may have various video and input/output (I/O) interfaces 24 as well as one or more communications interfaces 26. The interfaces 24 may be used to operatively couple the computer system 10 to various peripherals, such as a display 28, a keyboard 30, a mouse 32, other input devices, a microphone (not shown), a camera (not shown), a scanner (not shown), a printer (not shown), a speaker (not shown) and so forth. The communications interfaces 26 may include for example, a modem and/or a network interface card. The communications interfaces 26 may enable the computer system 10 to send and receive data signals, voice signals, video signals, and the like to and from other computing devices via an external network 34 (e.g., the Internet, a wide area network (WAN), a local area network (LAN), direct data link, or similar systems). The interface between the computer 12 and any operatively interfaced device or network may be wired or wireless.

The memory 20 may store an operating system 36 that is executed by the processor 18 to control the allocation and usage of resources in the computer 12, as well as provide basic user interface features. Specifically, the operating system 36 controls the allocation and usage of the memory 20, the processing time of the processor 18 dedicated to various applications being executed by the processor 18, and the peripheral devices, as well as performing other functionality. In this manner, the operating system 36 serves as the foundation on which applications, such as the tool 14, depend as is generally known by those with ordinary skill in the art. The operating system 36 also may control much of the user interface environment presented to a user, such as features of the overall graphical user interface (GUI) for the computer 12.

Using the computer 12, a user (e.g., a human operator) may use the tool 14 to carry out the functions described herein. In other embodiments, the computer 12 may be configured as a server that executes the tool 14 to host the functions for another computer, such as a computer system 38 associated with a spectrum holder, a computer system 40 associated with a spectrum user, and/or a computer system 42 associated with a spectrum intermediary. In one embodiment, the computer system 12 may be associated with a first spectrum intermediary. In this case, the computer system 42 may be omitted or the computer system 42 may be associated with a second spectrum intermediary. The client computer systems 38, 40 and 42 may have a similar architecture to the computer 12. For instance, the client computer systems may include a processor configured to execute software containing logical instructions that embody the functions of the client computer systems and a memory to store such software and related data. For example, the client computer system systems each may execute an interface tool 44 that allows the respective systems 38, 40 and 42 to interface and share data with the spectrum transfer tool 14. In one embodiment, the interface tool 44 may be custom software. In another embodiment, the tool 14 may host an Internet-style website and the interface tool 44 may be an Internet browser application.

It will be apparent to a person having ordinary skill in the art of computer programming, and specifically in application programming for data collection, data processing and/or expert systems, how to program the computer system 10 to operate and carry out logical functions associated with the spectrum transfer tool 14, the database 16 and the interface tool 44. Accordingly, details as to specific programming code and database structures have been left out for the sake of brevity. Also, while the tool 14 is executed by a general purpose computing device in accordance with a preferred embodiment, such functionality could also be carried out via dedicated hardware, firmware, software, or combinations thereof.

Figure 2:
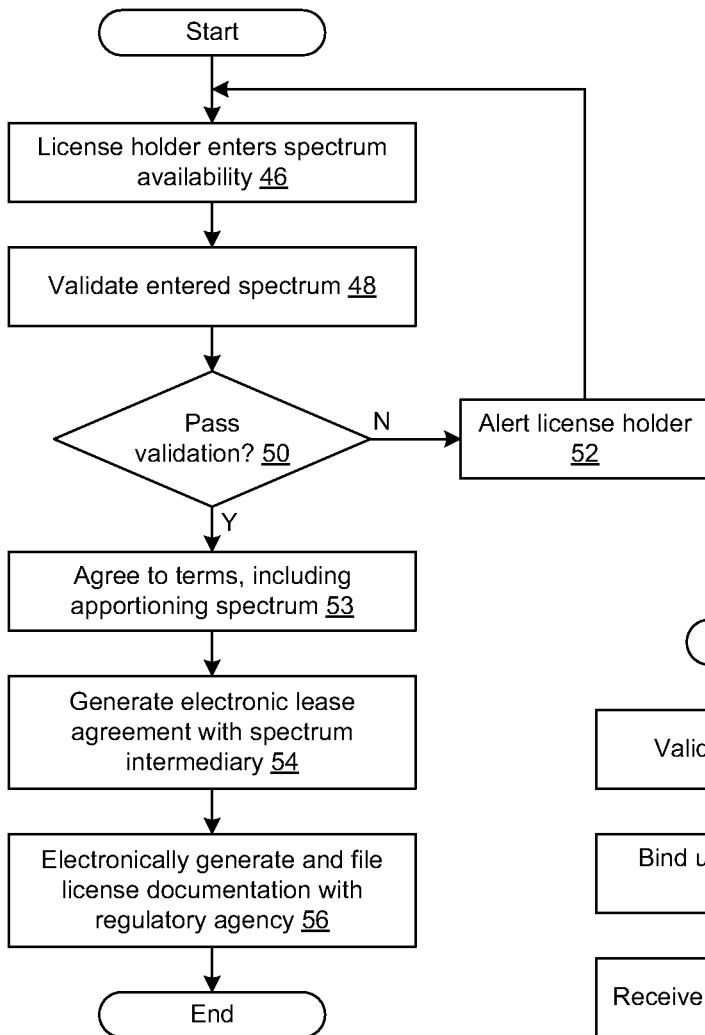
FIG. 2 is a flow chart representing a first exemplary method of transferring rights associated with spectrum.
Figure 3:
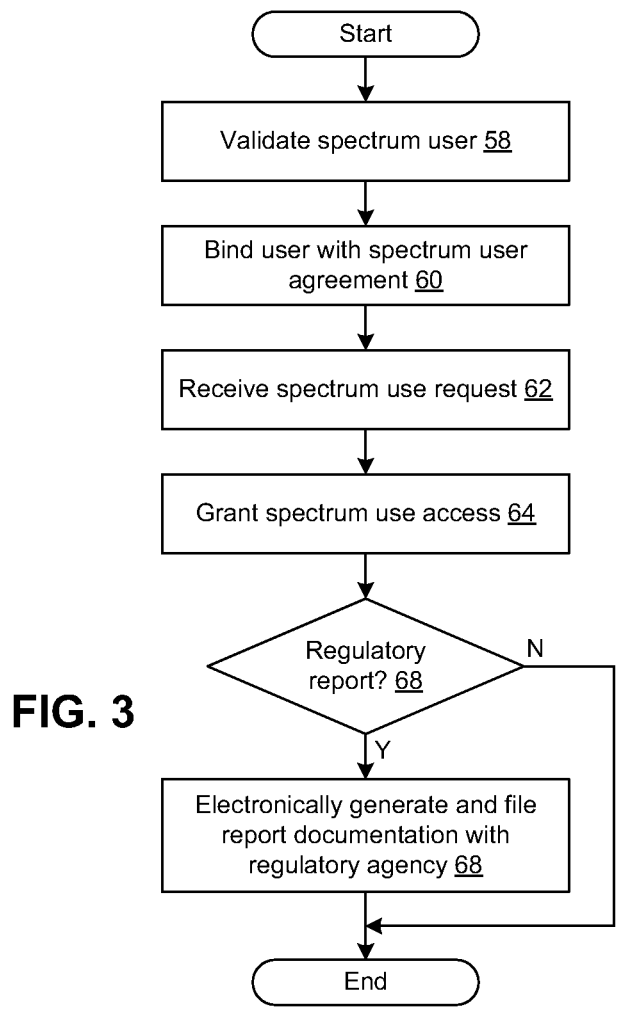
FIG. 3 is a flow chart representing a second exemplary method of transferring rights associated with spectrum.
Figure 4:
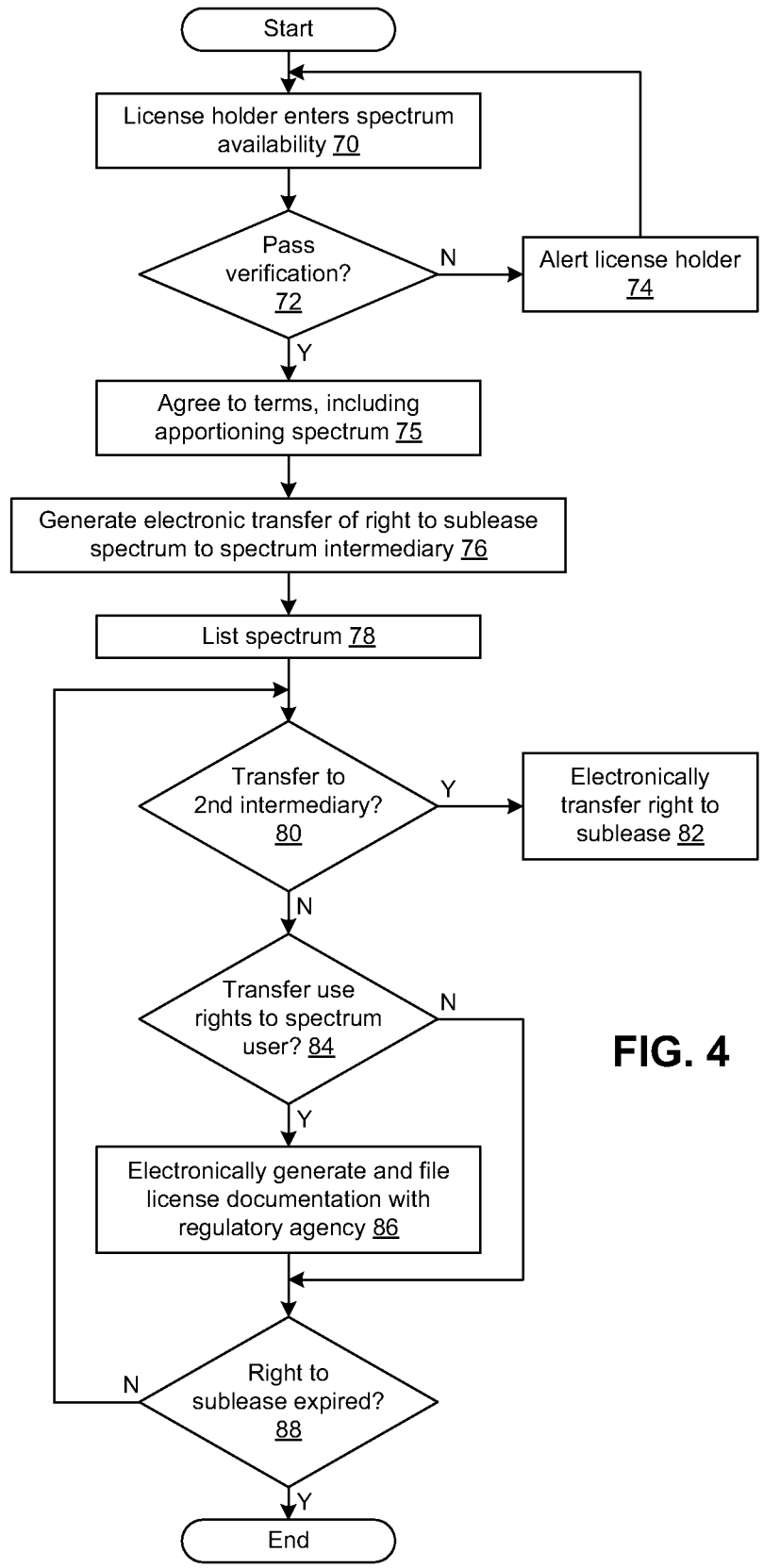
FIG. 4 is a flow chart representing a third exemplary method of transferring rights associated with spectrum.

With additional reference to FIGS. 2 through 4, illustrated are logical operations to implement exemplary methods of transferring rights associated with spectrum. The exemplary methods may be carried out by executing an embodiment of the spectrum transfer tool 14, for example. Thus, the flow charts may be thought of as depicting steps of one or more methods carried out by the computer system 10. Although the flow charts show specific orders of executing functional logic blocks, the order of executing the blocks may be changed relative to the order shown. Also, two or more blocks shown in succession may be executed concurrently or with partial concurrence.

C. SPECTRUM SUBLEASE USING SPECTRUM MARKET MAKER

As indicated, spectrum in the United States and other areas of the world is licensed to commercial entities by a regulatory authority (e.g., the FCC in the U.S.). Subsequent subleases or transfer of leases may be made in a secondary market, but within the rules and regulations defined by the regulatory authority. The process of transferring spectrum use rights is complex, even for persons experienced in regulatory compliance. Also, the process is time consuming and costly, and sometimes involves using expensive legal counsel.

The disclosed approach facilitates the process of transferring spectrum user rights from holders to users in a manner that reduces compliance burdens on the holder and user, thereby making the transaction faster and cheaper. The disclosed approach uses a combination of contractual obligations and automated processes to accomplish such facilitation in the transfer of spectrum use rights. As an example, suppose that a holder desired to apportion spectrum corresponding to a relatively small geographic region (e.g., a zip code) so that a user may sublease and use the apportioned spectrum in real time (e.g., a transfer of spectrum access rights for immediate use by the user). In this circumstance, FCC rules would need to be followed to the extent that the transaction may be undermined due to the cost and time involved in the compliance effort. That is, the regulatory delay, filing fees and costs would make an otherwise efficient use of spectrum into an uneconomic and impractical undertaking.

The disclosed approach addresses this issue in a way that maximizes preservation of the holder's rights and compliance with the FCC rules. The result is a process that provides a mechanism to quickly and cost-effectively provide spectrum access rights to users via a spectrum exchange platform, such as the spectrum transfer tool 14. The exchange platform minimizes the amount of information that is conveyed between the holder and user for the temporary transfer of spectrum use rights. The platform may track historical and current data regarding spectrum licenses, spectrum usage, and spectrum access right transfers so that a determination of what spectrum is being used where may be made. The holder also may have access to financial data in terms of how much was paid for previous spectrum use transfers so as to appropriately price apportioned spectrum. Users may have access to the same historical price data.

Through the execution of the spectrum transfer tool 14, computer technology is leveraged to facilitate the transfer of spectrum use rights. For example, an exchange transaction process may take place using the spectrum transfer tool 14, which may be made available to holders and users by a spectrum intermediary. In this embodiment, the spectrum intermediary may be considered a "market maker."

To provide an overview of the underlying process, the relationships among the parties will be described. This will be followed by a description of how the parties interact with the spectrum transfer tool and the functions of the spectrum transfer tool.

In an exemplary embodiment, the spectrum intermediary enters into a sublease agreement with a holder, such as a Commission licensee. The spectrum intermediary is responsible for filing any appropriate paperwork and fees with the regulatory agency (e.g., the FCC) to comply with appropriate regulatory rules and procedures that govern subleases in the secondary market. As will be described, this filing process may be automated using the spectrum transfer tool. The spectrum intermediary then grants one or more users limit access rights in the subleased spectrum. These grants of access rights may be considered a "renting" of the subleased spectrum. But no additional sublease between the spectrum intermediary and the user(s) is created. Rather, the user's or users' radios are managed so that the operation of the radios is in compliance with any rules that have been imposed on the spectrum. These rules may include regulatory body regulations (e.g., FCC regulations and requirements), rules established by the spectrum intermediary or other exchange on which spectrum availability is posted, and/or rules established by the spectrum holder (e.g., a non-compete provision so that users do not offer a service that competes with the holder).

The sublease between the holder and the spectrum intermediary may include certain provisions so that a sublease as defined by the appropriate regulatory agency is established. Exemplary provisions for a sublease in the U.S. may include, but are not limited to: the basic parameters of the lease in terms of time, frequency or channel plan, and geography; any exclusions or rules governing spectrum use that are dictated by the holder; a provision that indicates that the spectrum intermediary assumes liability for the correct use and operation of the spectrum and for the networks that use the spectrum to operate; and a provision that indicates that the spectrum intermediary will grant access to the spectrum to users and manage the users and their utilization of the spectrum. While the spectrum intermediary may manage the users, the spectrum intermediary need not manage use of spectrum that is licensed to the holder and that does not form a part of the sublicense. If the holder were to be a user (e.g., have a grant back for some of the sublicensed spectrum), the holder may fall within the management control of the spectrum intermediary. Other provisions of the sublease may relate to financial terms, such as royalties of spectrum rentals to users or a minimum guaranteed payment. Financial terms, however, are not directly germane to the disclosed techniques for transferring rights related to spectrum.

Exemplary components of a filing with the regulatory agency in the example of the FCC for U.S. subleases may include, but are not limited to: an indication that the spectrum intermediary has entered into a sublease for all or part of the license as defined by the geography, location and time components that identify the subleased spectrum; an indication that the spectrum intermediary intends to use the sublease to offer wireless service via a number of independent subnetworks, each of which will be controlled by spectrum intermediary using a spectrum exchange system (e.g., the spectrum transfer tool 14) through which users may acquire spectrum access rights as governed by spectrum certificates; an indication that the spectrum intermediary will be responsible for ensuring that all radios and/or subnetworks (e.g., the networks operated by the users) will operate with full compliance with regulatory agency rules; and, if applicable, an indication that spectrum use information and radio location information is available in real time to the FCC through an automated computer host.

The relationship between the spectrum intermediary and each user may be defined. Exemplary provisions for this relationship may include, but are not limited to: a provision that the user's operation will be in compliance with regulatory body regulations, rules established by the spectrum intermediary or other exchange on which spectrum availability is posted, and/or rules established by the spectrum holder; a provision that radio equipment is provided by the user; a provision that transmission characteristics and location of the radios are managed by the spectrum intermediary. If appropriate, the user's radios or network control equipment should be able to receive and operate in accordance with spectrum certificates that regulate spectrum use (e.g., radio transmissions) by the radios.

Automated processes that support the establishment of the above-described relationships among the parties and the regulatory agency compliance filing will be described in connection with FIGS. 2 and 3.

An exemplary logical flow of steps involving the holder and the spectrum intermediary are illustrated in FIG. 2. This process may start in block 46 where a spectrum holder enters information about spectrum that the holder desires to make available for sublease to the spectrum intermediary. The information may be entered into the spectrum transfer tool 14 through the interface tool 44 of the holder computer system 38. These tools 14, 44 may establish a graphical user interface that allows for aspects of spectrum to be defined quickly and efficiently. The aspects may include geography information, frequency or channel plan information, and time information. Information regarding the entered spectrum may be stored in the database 16.

The logical flow may then proceed to block 48 where the spectrum that has been entered by the holder is validated. The validation may include cross-checking the entered spectrum against known information about spectrum as stored in the database 16 or by third party databases (e.g., a spectrum information data vendor or the regulatory agency). The validation may be used to determine if the holder has the authority to sublease the spectrum, to determine if there are any competing interests in the spectrum (e.g., existing sublicenses), and/or to determine if there are any regulatory prohibitions on the transfer of spectrum use rights. Therefore, the database 16 may include (or the spectrum transfer tool 14 may access) information about spectrum licenses granted to holders, any sublicenses issued for the spectrum of the holder, and/or any other use-based information concerning the spectrum. Another test may be a check to determine if spectrum licensing rules (e.g., as defined by the regulatory agency) allow for the spectrum to be subleased or apportioned in the manner proposed by the holder. Using these validations, a determination may be made as to whether there are any factors that may hinder an end user's ability to use the spectrum defined by the holder in block 46 under the above-described relationships. The validation may be performed by a validation engine component of the spectrum transfer tool that is configured with appropriate rules engines to validate the entered spectrum.

If there are any factors that may hinder an end user's ability to use the spectrum, the validation may not pass in block 50. In this case, an alert may be provided to the holder in block 52. If the holder can modify the definition of the spectrum or correct the reasons for the validation failure, the logical flow may return to block 46 for re-entry of the spectrum. Otherwise, the logical flow may end.

If the validation passes in block 50, the logical flow may proceed to block 53. In block 53, the holder and spectrum intermediary may agree on terms for the sublease of the spectrum, including price and other considerations. Additional considerations may include, for example, any apportioning of the spectrum in terms of partitioning the spectrum, disaggregating the spectrum and/or time slicing the spectrum that is made available by the holder. In this manner, the exact spectrum that falls within the bounds of the sublease may be defined.

Then, in block 54, an electronic sublease agreement may be generated between the holder and the spectrum intermediary. For instance, the spectrum transfer tool 14 may generate a sublease agreement document from a template. The sublease agreement may be presented to the holder for acceptance to bind the holder to the terms of the electronic sublease agreement. Digital certificates or signatures may be used as part of the acceptance process. The sublease agreement may include the provisions described above. In addition, the spectrum may be added to a spectrum supply database. The spectrum supply data based may be stored as part of the database 16 and may include spectrum that is subleased by the spectrum intermediary from plural holders and that is available to users to engage in wireless communications. The spectrum supply database may be searchable by users so that the users may identify spectrum that may fulfill their spectrum use needs. Furthermore, the spectrum transfer tool 14 may include engines to apportion spectrum from the spectrum supply data to match the needs of the users in the case where a user does not desire all the spectrum of an individual sublease in terms of geography, frequency or channel plan, and/or duration. Also, the spectrum transfer tool 14 may include engines to combine spectrum from plural subleases where the user may desire spectrum that exceeds an individual sublease in terms of geography, frequency or channel plan, and/or duration.

Proceeding to block 56, the spectrum transfer tool 14 may automate the generation and submission of a compliance filing with the regulatory agency for the sublease that was generated in block 54. For this purpose, the spectrum transfer tool 14 may include a compliance engine. The compliance engine may match the spectrum of the sublease against regulatory agency filing requirements covering that spectrum in terms of geography, frequency or channel plan, and time. Appropriate forms may be completed or generated in an automated manner, or appropriate data for data fields of an electronic filing may be assembled. Human review of the forms or data, if appropriate, may be carried made. Thereafter, the forms or data may be automatically filed in an electronic format with the regulatory agency along with any appropriate fees. In circumstances where electronic filing may not be made, hardcopy forms may be printed for mailing or other appropriate submission technique.

An exemplary logical flow of steps involving a user and the spectrum intermediary are illustrated in FIG. 3. This process may start in block 58 where the user may be validated. Validating a user may involve confirming that a potential user is a legitimate, legally entitled, entity that can rent spectrum on the basis described above. The validation may be preformed on information entered by the user with an appropriate graphical user interface. Also the validation may be based on legal and regulatory requirements, as well as the type of radio equipment that the user will employ. The validation may be preformed by a validation engine component of the spectrum transfer tool that is configured with appropriate rules engines to validate the user. If the user is not validated, an error message may be presented to the user and the user may be provided with an opportunity to update the information to pass validation.

Following validation, in block 60, the user may be bound by the terms of the agreement between the spectrum intermediary and the user as described above. This step may include generation of an electronic agreement by the spectrum transfer tool 14 and an electronic acceptance of the agreement on the part of the user. Digital certificates or signatures may be used as part of the agreement process.

Next, the user may submit a request for spectrum in block 62. As indicated, the spectrum user may search the spectrum supply database for spectrum of interest and submit a request for specific spectrum. In another embodiment, the user may submit a request for spectrum that will fulfill the user's planned wireless application in terms of network type, desired throughput, etc. A matching engine may be used to match the spectrum request with available spectrum. The matching may include apportioning the spectrum from the spectrum that is subleased by the spectrum intermediary to efficiently meet the needs of the user.

Once a match is made, the user may be granted access to use the spectrum in block 64. As part of the grant of access, the user may be provided with an electronic transaction identifier and an electronic agreement that describes the details of the transaction. The user may be requested to accept the details of the transaction. A spectrum certificate may be provided to the user to electronically bind the radios of the user (e.g., using control circuitry in the radios or supervisory network equipment) to operate in accordance with the transaction.

In block 66, the spectrum transfer tool 14 may determine if a report should be submitted to the regulatory agency. For this purpose, the compliance engine may assess the use rights that have been made available to the user against regulatory agency reporting requirements covering that spectrum in terms of geography, frequency or channel plan, and time. For instance, for certain spectrum usage in the U.S., the location of each transmitter should be placed on file with the FCC. As part of the transaction, the user may supply information to satisfy any reporting obligations to the spectrum intermediary in an electronic form so that the spectrum intermediary may complete the reporting obligations. If reporting is to be completed, the logical flow may proceed to block 68 where the report is automatically generated and filed electronically (or by other appropriate means) with the regulatory agency.

As will be appreciated, the spectrum intermediary in this exemplary embodiment undertakes a spectrum management and control role over the users. Also, the spectrum that the spectrum intermediary subleases from the holders may be apportioned and made available to multiple users and/or the same user multiple times. Even though multiple access grants may be made, only one regulatory filing for a sublease may be made. It is noted, however, that in addition to the sublease filing, reports regarding aspects of network deployment may be filed. The user may remit financial consideration for the spectrum to the spectrum intermediary, but the details of how the financial consideration is paid is not directly germane to the disclosed techniques for transferring rights related to spectrum.

D. TRANSFER OF RIGHT TO LEASE SPECTRUM

In the foregoing embodiment, a sublease is created where use rights in spectrum are transferred from a holder to an intermediary. The transferred rights may further include the right to sublease the spectrum to another entity. In this section, described is an embodiment where the spectrum intermediary gains the right to sublease spectrum to others by transference of that right. Under this embodiment, it is possible that use rights are not transferred to the spectrum intermediary until the spectrum intermediary arranges a transfer of use rights to another entity. Alternatively, the spectrum intermediary may obtain use rights together with the right to sublease spectrum to another entity. As will become more apparent, the spectrum intermediary may be considered a "speculator" or an "investor" in these embodiments.

An exemplary logical flow of steps involving the spectrum intermediary and other parties (e.g., a holder, a user and second spectrum intermediary) are illustrated in FIG. 4. This process may start in block 70 where a spectrum holder enters information about spectrum that the holder desires to make available for sublease to others. The data entry of block 70 may be similar to block 46. The logical flow may then proceed to block 72 where the spectrum that has been entered by the holder is validated in a manner similar to blocks 58 and 50. If the validation determines that there are any factors that may hinder an end user's ability to use the spectrum, the validation may not pass in block 72. In this case, an alert may be provided to the holder in block 74 in similar manner to block 52. If the holder can modify the definition of the spectrum or correct the reasons for the validation failure, the logical flow may return to block 70 for re-entry of the spectrum. Otherwise, the logical flow may end.

If the validation passes in block 72, the logical flow may proceed to block 75. In block 75, the holder and spectrum intermediary may agree on terms for the right to sublease spectrum to others, including price and other considerations. Additional considerations may include, for example, any apportioning of the spectrum in terms of partitioning the spectrum, disaggregating the spectrum and/or time slicing the spectrum that is made available by the holder. In this manner, the exact spectrum for which the intermediary acquires a right to sublease may be defined.

Then, in block 76, an electronic agreement may be generated between the holder and the intermediary. For instance, the spectrum transfer tool 14 may generate an electronic agreement document from a template. The agreement may be presented to the holder for acceptance to bind the holder to the terms of the electronic agreement. The agreement may include a provision that authorizes the spectrum intermediary to sublease the spectrum to another entity. The entity may be a user or another spectrum intermediary. Under the premise that spectrum may increase in value in the future, other spectrum intermediaries may be interested in purchasing the right to sublease spectrum from the spectrum intermediary. In this manner, the spectrum may be viewed as a tradable commodity. In one embodiment, the holder may retain the right to use the spectrum until the spectrum intermediary arranges a sublease for the spectrum.

Treating the spectrum from the holder as a commodity, the spectrum may be added to the spectrum supply database that is described above. Then, in block 78, the spectrum may be listed in one or more manners. For instance, as a tradable commodity, the spectrum itself may be listed as being available for sublease and for use to operate radio equipment by a user. Also, the right to sublease the spectrum may be listed. The listing of a right to sublease the spectrum may be listed in one or more manners. For instance, the listing may describe an immediate right to be able to sublease the spectrum to a user for use. As another example, the listing may describe a futures type arrangement where a party may purchase the right to sublease and/or use the spectrum at this time, but the execution date of the transaction is at some point in the future. As another example, the listing may describe an options type arrangement where a party may purchase a future right to sublease and/or use the spectrum. At the end of the option period, the purchaser may execute the option to obtain the right to sublease and/or use the spectrum, or may allow the option to lapse without exercising the option. The spectrum intermediary also may use the spectrum in other types of arrangements, such as franchise arrangements or distributorship arrangements.

As indicated, the spectrum from the license holder may be apportioned by the spectrum holder from other spectrum holdings of the holder. Each listing may further apportion the spectrum. For instance, the spectrum intermediary may disaggregate the spectrum in frequency or channel plan, may partition the spectrum geographically, and/or time-slice the spectrum.

Using the automated spectrum exchange (e.g., trading market) implemented with the spectrum transfer tool 14, various other entities (e.g., spectrum users and other spectrum intermediaries) may search the spectrum listings to find spectrum of interest. Also, requests for spectrum to support a specified wireless application may be matched to available spectrum by the spectrum transfer tool 14. Therefore, the right to lease spectrum may be transferred from the spectrum intermediary to another entity. The transactions may be automated by the spectrum transfer tool 14. The spectrum intermediary may retransfer to the right to sublease the spectrum to other spectrum intermediaries, or the spectrum intermediary may execute the right to sublease the spectrum and transfer use rights in the spectrum to a user.

For example, if the right to lease spectrum is transferred to a second spectrum intermediary, a positive determination may be made in block 80. In that event, an electronic transfer of the rights may be made in block 82. The transfer may be logged in an appropriate portion of the database 16. The second spectrum intermediary may attempt to again transfer the right to sublease the spectrum or offer the corresponding spectrum use right to users (e.g., exercise the second spectrum intermediary's right to sublease the spectrum). In one embodiment, the second spectrum intermediary may list the spectrum on the same spectrum exchange as is used by the spectrum intermediary that acquired the right to sublease the spectrum from the holder.

If a negative determined is made in block 80, the logical flow may proceed to block 84. In block 84, a determination may be made as to whether the spectrum intermediary has executed the right to sublease the spectrum (in whole or in part as the result of apportioning) and transferred use rights in the spectrum to a user. If a positive determination is made in block 84, the logical flow may proceed to block 86. In one embodiment, a sublease may be generated and a sublease agreement may be electronically created. In addition, a sublease compliance filing may be made in an automated manner, such as the manner described in connection with block 56. Depending on the relationship between the parties and the nature of the transaction, the spectrum intermediary may exert management and control over the user's use of the spectrum. In this case, the user may be provided with a spectrum certificate to regulate use of the spectrum as described above.

Following block 86 or a negative determination in block 84, the logical flow may proceed to block 88. In block 88, a determination may be made to whether the right to sublease the spectrum has expired. The duration of the right may be determined based on the transaction between the holder and the spectrum intermediary, or by the expiration of the holder's lease on the spectrum. If the right to sublease the spectrum has not ended, the logical flow may return to block 80. If the right to sublease has ended, the logical flow may end. Also, if the spectrum is still listed, the listing may be removed from the spectrum exchange hosted by the spectrum transfer tool 14.

E. CONCLUSION

Various techniques for transferring rights relating to spectrum have been described. Through these techniques, efficient and productive use of spectrum may be made, while minimizing the regulatory agency compliance burdens on spectrum holders and/or spectrum users.

Although certain embodiments have been shown and described, it is understood that equivalents and modifications falling within the scope of the appended claims will occur to others who are skilled in the art upon the reading and understanding of this specification.

What is claimed is:

1. A computer implemented method of transferring rights associated with spectrum, comprising:
   receiving, by an automated spectrum exchange server system, a description of spectrum that is available for sublease from a spectrum holder;
      wherein the spectrum description includes geographic information, frequency information and time information;
   creating, by the automated spectrum exchange server system, a sublease agreement between the spectrum holder and a spectrum intermediary for the described spectrum;
      wherein the spectrum intermediary is a different party than the spectrum holder;
   apportioning, by the automated spectrum exchange server system and to a spectrum user radio equipment, an amount of the described spectrum;
      wherein the spectrum user radio equipment is operated by a different party than each of the spectrum intermediary and the spectrum holder;
      wherein the spectrum user radio equipment creates a sub-network within confines of the created sublease;
      wherein the spectrum user radio equipment conducts wireless communications over the sub-network and in the apportioned amount of the described spectrum; and
   granting, by the automated spectrum exchange server system and to the spectrum user radio equipment, access permission to the apportioned amount of the described spectrum;
   providing, by the automated spectrum exchange server system and on behalf of the spectrum intermediary, electronic control over the spectrum user radio equipment to conduct the wireless communications;
   assigning, by the automated spectrum exchange server system, a spectrum-related variable under which the spectrum user radio system is to engage in wireless communications;
   creating, by the automated spectrum exchange server system, a spectrum certificate that contains the assigned spectrum-related variable; and
   issuing, by the automated spectrum exchange server system and to the spectrum user radio equipment, the spectrum certificate; and
      wherein the spectrum certificate electronically binds transmissions of the spectrum user radio equipment.

2. The method of claim 1, submitting, by the automated spectrum exchange server system to a governing regulatory agency, a regulatory agency report with data regarding transmitter locations for radio equipment of the spectrum user radio equipment that operate under the granted access permission.

3. The method of claim 1, wherein the spectrum-related variables of the spectrum certificate that electronically binds transmissions of the spectrum user radio equipment include a time window, a frequency-based spectral mask, a geography-based emission mask and a transmit power limit.

4. The method of claim 1, wherein the described spectrum is apportioned from a larger spectrum holding of the spectrum holder.

5. The method of claim 1, further comprising validating the described spectrum, with the automated spectrum exchange server system, by determining that there are not regulatory or prior spectrum allocation hindrances to a spectrum user's ability to use the described spectrum.

6. The method of claim 1, wherein the access grant is made by matching, with the automated spectrum exchange server system, a request from the spectrum user radio equipment for spectrum to operate a wireless application with the subleased spectrum.

7. A system for transferring rights associated with spectrum, comprising:

a processor;

a memory that stores executable code when executed by the processor, causes the processor to perform the steps of:

receiving a description of spectrum that is available for sublease from a spectrum holder;

wherein the spectrum description includes geographic information, frequency information and time information;

creating a sublease agreement between the spectrum holder and a spectrum intermediary for the described spectrum;

wherein the spectrum intermediary is a different party than the spectrum holder;

apportioning to a spectrum user radio equipment, an amount of the described spectrum;

wherein the spectrum user radio equipment is operated by a different party than each of the spectrum intermediary and the spectrum holder;

wherein the spectrum user radio equipment creates a sub-network within confines of the created sublease;

wherein the spectrum user radio equipment conducts wireless communications over the sub-network and in the apportioned amount of the described spectrum;

granting to the spectrum user radio equipment, access permission to the apportioned amount of the described spectrum;

providing on behalf of the spectrum intermediary, electronic control over the spectrum user radio equipment to conduct the wireless communications;

assigning a spectrum-related variable under which the spectrum user radio equipment is to engage in wireless communications;

creating a spectrum certificate that contains the assigned spectrum-related variable;

issuing to the spectrum user radio equipment, the spectrum certificate; and wherein the spectrum certificate electronically binds transmissions of the spectrum user radio system.

8. The system of claim 7, wherein the code also contains logic to submit a regulatory agency report to a governing regulatory agency with data regarding transmitter locations for radio equipment of the spectrum user radio system that operate under the granted access permission.

9. The system of claim 7, wherein the spectrum-related variables of the spectrum certificate that electronically binds transmissions of the spectrum user radio equipment include a time window, a frequency-based spectral mask, a geography-based emission mask and a transmit power limit.

10. The system of claim 7, wherein the described spectrum is apportioned from a larger spectrum holding of the spectrum holder.

11. The system of claim 7, wherein the code also contains logic to validate the described spectrum by determining that there are not regulatory or prior spectrum allocation hindrances to a spectrum user's ability to use the described spectrum.

12. The system of claim 7, wherein the code also contains logic to match a request from the spectrum user radio equipment for spectrum to operate a wireless application with the subleased spectrum to grant the spectrum access.

13. The method of claim 1, further comprising submitting, with the automated spectrum exchange server system, a regulatory agency filing for the sublease to a regulatory agency that governs use of the described spectrum.

14. The system of claim 7, wherein the code also contains logic to submit a regulatory agency filing for the sublease to a regulatory agency that governs use of the described spectrum.

\* \* \* \* \*